United States Patent Office 2,805,348
Patented Sept. 3, 1957

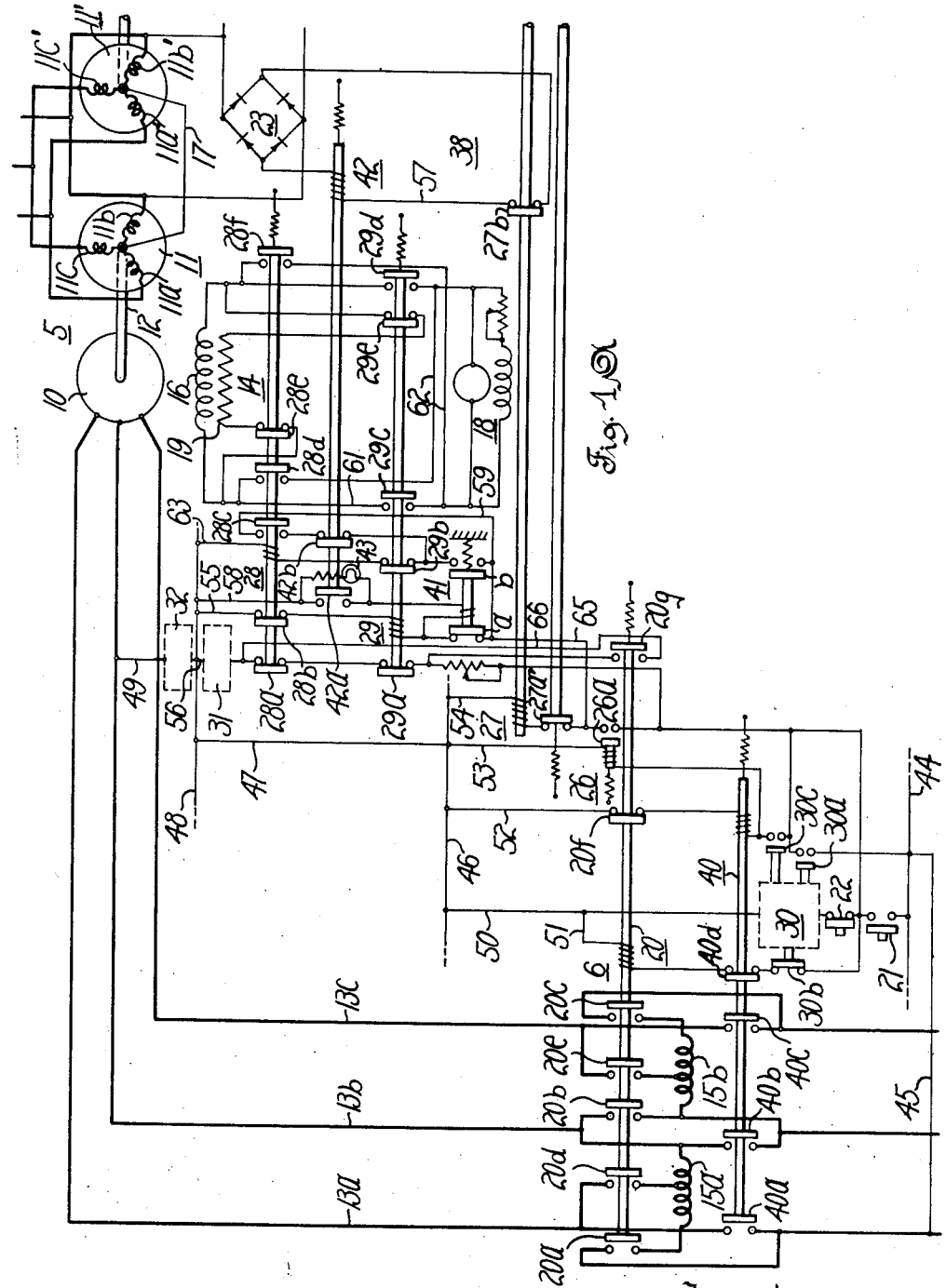

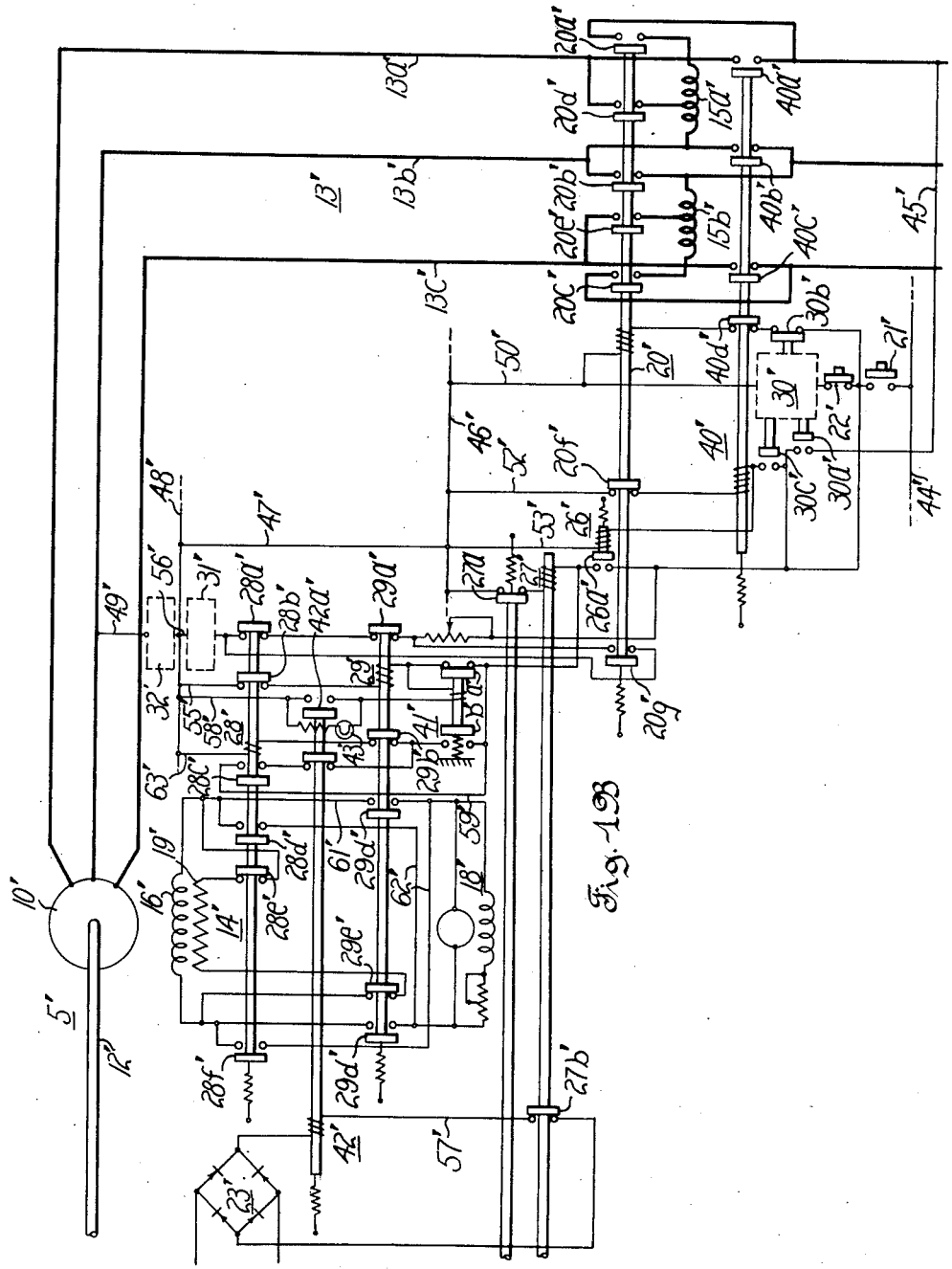

2,805,348

DUAL AUTOMATIC PHASING CONTROL FOR SYNCHRONOUS MOTORS

Thaddeus F. Bellinger, West Allis, Wis., assignor to Allis-Chalmers Manufacturing Company, Milwaukee, Wis.

Application December 27, 1955, Serial No. 555,723

4 Claims. (Cl. 307—87)

This invention relates to electrical circuits for synchronous motor control and particularly to interrelated control circuits for providing parallel operation of two or more alternating current motor-alternating current generator sets.

In order to operate two or more of these sets with the output of the generators connected in parallel to supply a load, it is necessary that the generators be operating with no phase angle relationship existing between the corresponding phases of the different generators of the sets. It is this problem of establishing exact matching of relative phase relationships to which this invention is directed.

It is an object of this invention to provide for selectively reversibly exciting the field of synchronous motors of alternating current motor driven alternating current generator sets connected in parallel for automatically, alternately reversing the direct current field excitation of either one of the motors as long as the two motor generator sets are out of phase.

Still another object of this invention is to provide a control system whereby alternating current motor generator sets either may be controllable for operation alone or in parallel with another set and selectively, automatically controlled as a lead set to which the other set is matched for synchronous operation or made to be a follower set brought into synchronism to match the lead motor generator set.

Still another object of this invention is to provide a control for paralleling synchronous motor operated motor generator sets wherein phase angle displacement between like phases of the generators, after the motors have been brought to synchronous speed, will effect automatic alternate reversing of the field polarity of one of the sets until the proper phase relationship of the generators is effected.

Objects and advantages other than those outlined above will be readily apparent from the following detailed description when read in connection with the accompanying drawing in which the single figure diagrammatically illustrates an embodiment of the invention applied to a three phase synchronous motor generator set.

In summary the mentioned objects are accomplished by providing separate but interlocked synchronous operation controllers for alternating current motor generator sets with reverse polarity motor field winding means responsive to a signal produced by any improper phase angle relationship of the generators.

The single figure of the drawing is a diagrammatic illustration of this invention showing the control circuitry for two motor generator sets, in deenergized position.

In the illustration the two motor generator sets are designated by reference characters 5 and 5'. These are similar motor generator sets and controllers, each having identical components, with similarly numbered characters of reference but with the right hand set as viewed in the drawing marked with prime numbers.

The identification of components of one set will therefore be applicable to both, considering the similarity of marking identical components.

Motor 10 which drives generator 11 through suitable means 12 is supplied from a three phase alternating current source 13.

That motor may be started as an induction motor in any adequate manner and is illustrated as provided with both a reduced voltage and a full voltage starting system 6. The circuit for starting includes a start push button 21 between three phase source phases 13a and 13b. For illustration purposes the starting circuit is shown as connected between buses 44 and 46 which are connected by lead 47 to an exciter circuit bus 48 and through overload protector 32 and lead 49 to phase 13b. Lead 45 connects bus 44 to phase 13a.

Reduced voltage starting means includes line 51 connected through start push button 21 to bus 44. Line 51 has in series the coil of starting contactor 20, normally closed contact 40d of running contactor 40 and normally closed contact 30b of master time delay relay 30 (contact 30b operates to open position only a suitable time after relay 30 is energized). Further, part of the reduced voltage starting means are transformers 15a and 15b across phases of source 13, and contacts 20a through 20e of contactor 20 which, when starting, connected the transformers across the source.

Motor 10 operates as an induction motor with field winding 16 shunted by resistor 19 for a certain predetermined time, then the voltage source to the motor armature winding is switched to full line or source voltage. The motor continues as an induction motor with resistor 19 shunted across field winding 16 until another time period determined to be sufficient to bring the motor to proper synchronizing speed.

Consequently, suitable means are provided for synchronizing the motor. For this purpose, there is shown as an example a means including a master timing delay relay 30 energized by closing start push button 21. This relay is shown in parallel circuit with start line 51. Three contacts are operative by this relay. One is the normally closed contact 30b in series with the coil of start contactor 20. Contact 30b will not move to open circuit contactor 20 until after a time delay corresponding to the period for motor starting on reduced voltage. Coordinated with the opening of contact 30b is the closing of normally open contact 30c in a short series extension of lines 52 and 53.

Line 52 includes the coil of running contactor 40. There are three normally open contacts 40a, 40b and 40c of this running contactor. These close and connect fully supply voltage 13 to the motor armature, coordinated in operation with the opening of start contactor contacts 20a through 20e.

Contactors 20 and 40 are interlocked as for example by their having normally closed contacts 20f and 40d, respectively, in the other contactors coil circuit. They cannot be energized at the same time.

In parallel circuit with the coil of contactor 40 is the coil of timing relay 26, which has a single normally open contact 26a that does not close until the motor armature has had full source voltage for sufficient time to be up to near synchronous speed.

This timing relay is effective as a means for automatically applying a direct current exciting current to field winding 16 and disconnecting shunt resistor 19 from across that winding. For accomplishing this contact 26a closes the circuit to line 65 and 55. And line 55 has the coil of field contactor 29. In series with that coil are two normally closed contacts 28b, an interlock contact of reversing field contactor 28 and 41a of double acting phase timing relay 41.

To bring motor 10 to synchronous speed there is field exciter 14 which includes field winding 16, its conventional shunting resistor 19, direct current exciter 18, circuit 61 for applying one polarity to field 16 and circuit 62 for reversing or applying an opposite polarity to that field. Both circuits 61 and 62 are normally open, having, respectively, normally open contacts 29c, 29d and 28d and 28f. Contacts 29c and 29d are closed when the coil of field contact 29 is energized. And contacts 28d and 28f are closed by energizing the coil of reversing field contact 28. Either of these contactors when energized opens associated contacts in the shunt resistor circuit, namely, normally closed contacts 29e and 28e.

Field reversing contactor 28 has its coil in line 63 that is an alternate circuit to line 55. Line 63 besides that contactor coil has, in series, normally closed contact 29b interlocking with contactor 29 and normally open contact 41b of double acting phase timing relay 41. A holding circuit, line 59 having in series normally closed contact 42b and normally open contact 28c, is shunted across contact 41b.

One or the other alternate line 55 or 63 is energized at a time because of relay 41. Either one or the other contact, 41 or 41b, is closed or open at one time and alternately. And contact 41a is placed to deenergize relay 41 when open. A preferred means of accomplishing this is by making relay 41 move both its contacts a time interval after energization and a time interval after deenergization. The coil of this relay is in line 58 having normally open contact 42a, paralleled by a signal lamp 43 operatively short circuited when contact 42a is closed.

This alternate energization of the field application relays, 29 and 28, is effective because of phasing relay 42 closing contact 42a, and phasing relay 42 is energized only in response to a suitable signal from corresponding phases of generators 11 and 11' being out of proper phase relationship. It will be noted that the two field application contactors have their coils in interlocked circuits. Contact 28b is in circuit with the coil of relay 29, and contact 29b is in circuit with the coil of relay 28.

This phase angle relationship detector 38 is as follows. A source signal for operating relay 42 is provided by an out of phase relationship. This is shown in that the coil of relay 42, with normally closed contact 27b in series with it, is supplied by a voltage source circuit in which phrases 11b and 11'b are in subtractive relationship. More specifically this is shown with the coil of relay 42 across the output terminals of a full wave rectifier 23. (Rectifiers, although shown, may or may not be required.) The input terminals of that rectifier are in circuit as a load with phases 11b and 11'b in subtractive relationship. The neutrals of the two generators are connected together by line 17. Common phase terminals of generators 11 and 11' are connected to the input terminals of rectifier 23, and this input circuit may, as shown, be the same for both motor generator sets, with the inputs of rectifiers 23' and 23 connected in parallel.

Included in the overall controller circuitry are suitable protective means. Symbolically these are represented by incomplete sequence relay 31, providing protection for prolonged starting, and overload protector 32. Overload protector 32 is always in live circuit as long as start button 21 is closed or contact 30a is closed. Contact 30a closes instantaneously upon energization of master timing relay 30.

Sequence protector 31 is in line 56 which has in series normally closed contacts 28a and 29a of each field application contactor 28 and 29, respectively. Consequently sequence protector 31 is deenergized when direct current is applied to field 16 from exciter 18, thus effectively making sequence protector 31 part of the starting circuitry.

The motors of the motor generator sets may, for example, be 440 volt, 60 cycle motors.

An example of a suitable generator is a 400 cycle machine. The motor and controller of control circuit for such example are operated from the 440 volt, 60 cycle source 13.

As for operation, motor 10 is one which may be started as an induction motor at reduced voltage through the suitable autotransformer means 15a and b connected between phases 13a and b, and 13b and c of the supply. After initial starting period on that reduced voltage the control automatically switches the motor to the full voltage of the source 13. After the motor has been operated for a time at the full supply voltage and is operating at no load on the generator with the motor at relatively low slip cycle, the motor is automatically brought into synchronism by connecting the direct current field winding of the motor to a suitable direct current source, as for example, connecting field 16 to exciter 18.

The starting circuit is connected between line 13a and 13b with the voltage between those phases as the source for the control circuitry. Specifically the starting is started by pushing push button 21. This simultaneously energizes starting contactor 21 in parallel with master time delay relay 30 and with line 56, placing the sequence protector 31 and overload protector 32 in circuit.

This master timing relay has a normally closed contact 30b and two normally open contacts 30a and 30c. Upon energization of master timing relay 30 its contact 30a instantly closes. However, contact 30b and 30c operate only after a suitable time delay which may be adjustable for example between 2 and 100 seconds. Starting contactor 20 in its deenergized position has five normally open contacts associated with the supply source 13 and the autotransformers 13a and b. These five normally open contacts close upon energization of coil of contactor 20 and connect the autotransformers 15a and b across the source applying a reduced source voltage to the leads to the armature winding of motor 10.

Full voltage from the source is automatically applied to the armature winding of motor 10 after the delayed operation of master timing relay 30. This is effected through the closing of normally open contact 30c to energize what may be termed the running voltage circuit 52 of the starting system with simultaneous opening of contact 30d in the reduced voltage starting circuit 51. Upon opening of contact 30d coil 20 of the starting contactor is deenergized and its contact 20f closes in circuit 52.

Thus, with contact 30c of the master timing relay closed and with contact 20f of contactor 20 closed, the coil of running contactor 40 is energized. This will cause closing of the normally open contacts 40a, 40b and 40c of that contactor placing the full voltage source 13 across the armature windings of motor 10.

It will be seen that starting contactor 20 and running contactor 40 are interlocked in their respective circuits by means of their respective normally closed contacts 40d and 20f. Thus, when the master timing relay opens its contact 30b, contactor 20 deenergizes and opens all of its normally opened contacts in the reduced voltage starting circuit. At the same time it closes its normally closed contact 20f in the running contactor coil circuit. Thus, contactors 40 and 20 are not energized at the same time.

Motor 10 is operated as an induction motor at full voltage for a predetermined time through line 53 parallel with line 52. Line 53 includes therein a coil of exciter timing relay 26. This timing relay is energized and its timing cycle started simultaneously with the closing of delayed operating contact 30c of the master timing relay. After the time delay for relay 26 has elapsed, its normally opened contact 26a will close in line 54 to energize circuits for the application of the field winding 16 to its D. C. source, exciter 18.

Motor 10 is brought into synchronous operation by application of direct current to field 16. This is accomplished a predetermined time after the armature winding of the motor has been operating at full source voltage and the slip cycle of the motor is low. At that time the normally open contact 26a of time delay relay 26 closes completing circuits to lines 65 and 55 and energizing the coil of field contactor 29. There are two normally closed contacts in series with that coil. These are interlock contacts with other circuits, specifically being normally closed contacts 28b of reverse polarity contactor 28 and normally closed contact 41a of phasing timing relay 41.

Upon energization of coil 29, a pair of normally open contacts 29c and 29d are closed in circuit 61 of exciter means 14 connecting direct current exciter 18 to field 16 providing that field with a voltage of a first polarity. The application of current to D. C. field 16 of motor 10 will bring that motor into synchronous speed operation in a well known manner.

Simultaneously with the application of current to field 16 the sequence protector 31 is deenergized as normally closed contact 29a in series in that circuit is opened by coil 29. Likewise at that same time the conventional shunt field resistor 19 is open circuited by coil 29 opening its normally closed contact 29e.

In this operation there is an overlapping of time of contact controlling resistor 19 to protect field winding 16. This overlap is effective in the operation of reverse field application that is in response to a signal derived through a generator out of phase relationship detector 38.

Since either of the two motors can be started first and brought into synchronism as the lead motor, there is provided in accordance with this invention lockout means for making the lead motor, whichever it may be, insensitive to detector 38. For this purpose, in the embodiment shown, the closing time delay relay contact 26a completes circuit 54 in parallel with a circuit for the coil of field contactor 29. This circuit, 54, includes a coil of phase lockout relay 27 which carries two normally closed contacts 27a and 27b. Upon energization of the coil of that relay, contact 27a opens in circuit with the corresponding phase lockout relay coil 27' of the other motor generator set controller, thereby deenergizing the lockout relay of that other circuit. At the same time normally closed contact 27b opens deenergizing the circuit portion of detector 38 that is associated with the first lead motor, 10, incapacitating the field polarity reversing means for that motor. It will be noted that this phase lockout relay 27 of motor 10 has its coil in series with the normally closed contact 27'a of the other motor controller and that upon energization of coil 27 the other corresponding relay is deenergized because of contact 27a opening in its circuit and the circuit for relay 27 (of the then lead motor 10) is permanently closed as long as the start switch is closed, whereas the circuit for coil 27' (of the then follower motor 10') is opened. At this point the operation of the circuit components for the control of motor 10 which has become the lead motor are static, and the operation of the synchronous phase meshing portions of the controller circuit are automatically made inoperative. This is accomplished so that the other or follower motor generator set may be made to match the phase angle of the lead set.

Operation of the second motor 10' is begun in the same manner as for the first. Closure of start push button 21' energizes starting contactor 20' applying partial voltage to the armature winding of motor 10'. After a time delay transfer master timing relay 30' causes a time delayed operation of contact 30'c along with 30'b, the connecting contactor 40' in a live circuit to apply the full voltage of source 13 to armature winding of motor 10'. It may be noted that when push button 21 is closed transfer master timing relay 30' closes its instantaneous contact 30'a so that at all times of the operation of the motor generator set the protective device 32' is connected in circuit, and during the starting operation when running at partial or full voltage the incomplete sequence protective relay 31' is in a live circuit.

After a period of operation at full voltage with field 16' protected by being short circuited through field resistor 19', the motor is brought up to a speed having very low slip cycle and the field winding 16' is switched over to its D. C. source, exciter 18'. As with lead motor 10 this is accomplished after the closing of normally opened contact 26'a of time delay relay 26', completing a circuit through line 65' and 55' to bus 48'. (At this time with the motor 10 operating at synchronous speed and being a lead motor, parallel circuit 54' is opened because contact 27'a is opened, as mentioned before.) Closure of contact 26'a completes the circuit for the coil of field contactor 29' thereby operating its associated contacts. Two of these contacts, 29'c and 29'd, which were normally open, are thereby closed and contacts 29'e are opened. The opening of contacts 29'e opens circuits field shunting resistor 19' and there is a momentary delay in the opening of contact 29'e after operation of 29'c and 29'd. Closing of the two contacts 29'c and 29'd applies a first polarity of direct current from exciter 18' to field 16' to bring motor 10' into synchronous speed operation.

After second motor 10' has been brought into synchronous operation when the field winding 16' is energized with suitable D. C. current and with no load on the generators, the differential phase detector 38 becomes effective to assure the correct phase relationship of the two generators. In this detector with the neutral points of the two generators connected together by lead 17, a circuit is completed from the terminals of corresponding phases 11'b and 11b of the two generators to the input terminals of the full wave rectifiers 23' and 23. The output terminals of full wave rectifier 23' are connected through the normally closed contact 27'b of the phasing lockout relay and the coil of phasing relay 42'. Since motor 10 is a lead motor, the output terminals of rectifier 23 at that time would be in an open circuit as 27b would be open. Consequently the coil of phasing relay 42' is then connected across like phases of the 400 cycle generators. If a phase angle displacement exists between those like phases 11'b and 11b after the two driving motors 10' and 10 have been synchronized, a voltage equal to the vector sum of the two lines to neutral voltages will exist and will be sufficient to operate the phasing relay. Such a signal from this detector as will operate that relay is made effective, as long as the two generators are out of phase to alternately reverse the polarity of the field winding 16' at predetermined time intervals, such as 5 seconds, until the two generators are in phase at which time the phasing relay will drop out or be deenergized. At that time the follower motor will continue to operate with its field energized with the polarity which causes proper phasing.

In the example illustrated there are six different pole positions at which the synchronous driving motors can be locked in. And the 400 cycle generators will be in phase at any two of these pole positions which are 180° apart mechanically. Consequently the field reversing would not occur more than two times in order to obtain correct generator phasing.

This automatic phasing which should be accomplished only under no load conditions on the generators is accomplished as follows: Upon being energized the phasing relay will operate normally open contact 42'a and normally closed contact 42'b. In closed position contact 42'a completes the circuit of line 58' energizing the coil of double acting phase timing relay 41. This relay is energized through line 65 and a line which includes in series with the relay a normally closed contact of the relay itself, contact 41'a. A time delay upon energizing, the coil actuates opening contact 41'a and closing contact 42'b. Opening the first contact deenergizes the coil of field contactor 29' which opens exciter means circuit 61' between exciter 18' and field 16', but simultaneously closes the circuit of line 63' energizing the coil of field reversing contactor 28' through series connected closed contact 29'b and 41'b. Field reversing relay 28' is then energized, opening the normally closed contact it has electrically interlocking with the coil of field contact 29', opening a normally closed contact for the sequence protector in circuit 56' at 28'a enclosing a normally open contact 28'c in a holding circuit 59' shunting contact 41' of the double acting time relay. At the same time the field reversing contactor 28' is closing two normally open contacts in exciter means line 62' reversing the polarity of field 16'. Also the relay opens contact 28'e disconnecting the field shunting resistor 19', coordinating operation that the field never is open circuited.

The double acting phase timing relay preferably incorporates two adjustable timing functions which cause its contacts to operate a time delay after energizing and also a time delay after deenergizing. Thus, if this first reversal of polarity of field 16' is not effective to bring the phases to the same angle, there will still exist a voltage on the phasing relay coil 42' so that after the lapse of a time interval, after which the coil of relay 41 is deenergized, its contacts will again operate disconnecting the reverse field contactor 28' and energizing (after that contactor recloses its contact 28'b) the other field contactor 29'. Momentarily after deenergization of field reversing contactor 28', resistor 19' is shunted across field 16', and immediately after energization of the other contactor 29', that resistor is open circuited at contact 29'e and the field is connected through line 61' to the exciter 18' reversing its polarity. This automatic operation changing the field polarity for the motor will be continuous at the predetermined time intervals for which the double acting phase timing relay 41' is set so long as there is a phase angle between the corresponding phases of the generators providing a signal of voltage to phasing relay 42'. However, when there no longer exists a differential between those phases the coil of relay 42' will be deenergizing open circuiting line 58' to the double acting phase timing relay 41' and closing contact 42'b in holding circuit 59' (which when the field reversing contactor 28' is energized becomes a holding circuit maintaining that contactor continuously energized if the phasing delay 42' drops out or is deenergized). Thus, even though on such deenergization of the phasing relay 42' there is a resulting deenergization of double acting timing relay 41' with a subsequent time delayed closing of its contact 41'a and opening of its contact 41'b, the control system effects no change in the polarity of field 16'. The holding circuit 59' maintains the coil of field reversing contactor 28' energized whereas the electrical interlock contact 28'b is in open position preventing energization of the other field contactor 29'.

Although but a single embodiment of this invention has been shown and described, it will be apparent to those skilled in the art that various modifications may be made therein without departing from the spirit of the invention or from the scope of the appended claims.

It is claimed and desired to secure by Letters Patent:

1. A first polyphase generator, motor means for driving said first generator at a predetermined speed, electrical means for slipping of armature poles of said motor means at time intervals, a second polyphase generator, means for driving said second generator at said predetermined speed, detector means for producing a signal in response to existence of a phase angle differential between said generators, and means responsive to said signal from said detector to energize said electrical means.

2. A first polyphase generator, a motor, direct current field excitation means for operating said motor at synchronous speed, a controller for reversing said field excitation means at time intervals to cause the rotor of said motor to slip poles, a second polyphase generator, means for driving said second generator at a speed to match the speed of said first generator, and means responsive to out of phase relation between corresponding phases of said two generators to energize said controller.

3. In combination, first and second alternating current motor generator sets; each said motor generator set comprising a motor driving a polyphase generator, a field for operating the motor at synchronous speed, excitation means for applying direct current to said field, first means for connecting said exciter means with a first polarity to said field, second means for connecting said exciter means with a reverse polarity to said field, control means for alternately operating said first and second means including phasing means responsive to said two generators being out of a preselected phase relationship with respect to each other.

4. In combination, first and second alternating current motor generator sets; each said motor generator set comprising a motor driving a polyphase generator, a field for operating the motor at synchronous speed, excitation means for applying direct current to said field, first means for connecting said exciter means with a first polarity to said field, second means for connecting said exciter means with a reverse polarity to said field, control means for alternately operating said first and second means including phasing means responsive to said two generators being out of a preselected phase relationship with respect to each other, and means responsive to one of said sets reaching synchronous speed to make inoperative said control means for alternately operating the polarity of said field of said one set.

No references cited.